United States Patent [19]
Weaver

[11] 3,879,434
[45] Apr. 22, 1975

[54] BIS-METHINE COMPOUNDS
[75] Inventor: Max A. Weaver, Kingsport, Tenn.
[73] Assignee: Eastman Kodak Company, Rochester, N.Y.
[22] Filed: Nov. 23, 1970
[21] Appl. No.: 92,268

Related U.S. Application Data
[62] Division of Ser. No. 675,799, Oct. 17, 1967, Pat. No. 3,597,434.

[52] U.S. Cl. .............. 260/465 D; 8/54.2; 8/178 R; 8/179; 260/287 R
[51] Int. Cl. .......................................... C07c 121/70
[58] Field of Search ............................... 260/465 D

[56] References Cited
UNITED STATES PATENTS
3,386,491  6/1968  Weaver ............................... 260/465
3,435,062  3/1969  Marrable ............................ 260/465
3,504,010  3/1970  Straley et al. ...................... 260/465

Primary Examiner—Lewis Gotts
Assistant Examiner—Dolph H. Torrence

[57] ABSTRACT

Compounds having two cyanomethylideneaniline moieties linked together through the aniline nitrogen atom of each by a group having the formula

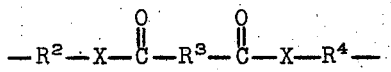

wherein $R^2$ and $R^4$ each is alkylene, X is oxygen or nitrogen and $R^3$ is alkylene which can be interrupted by an oxygen, sulfur or nitrogen atom, vinylene, ethynylene, cycloalkylene, cycloalkyldialkylene, arylene or naphthylene are useful as dyes for hydrophobic textile materials such as polyester fibers.

10 Claims, No Drawings

BIS-METHINE COMPOUNDS

This is a division of our U.S. application Ser. No. 675,799, filed Oct. 17, 1967, now U.S. Pat. No. 3,597,434.

This invention relates to certain novel methine compounds and, more particularly, to bis-methine compounds which are useful as dyes for hydrophobic textile materials.

The bis-methine compounds of the invention are characterized by the general formula

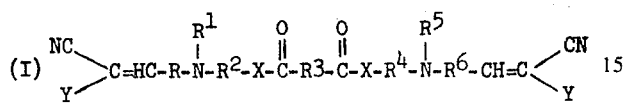

wherein

R and $R^6$ individually are the same or different and each represents a p-phenylene group;

$R^1$ and $R^5$ individually are the same or different and each represents a lower alkyl group, a cycloalkyl group or a phenyl group;

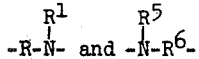

are the same or different and each, when taken collectively, represents a 1,2,3,4-tetrahydroquinolin-1,6-diyl group;

$R^2$ and $R^4$ are the same or different and each represents a lower alkylene group;

$R^3$ represents lower alkylene, alkylene containing a sulfur, oxygen or nitrogen atom in the main chain, vinylene, ethylene, a cycloalkylene group, lower cycloalkylenedialkylene group, a phenylene group, or a naphthylene group;

X represents oxygen, or nitrogen, e.g.,

where $R^9$ is hydrogen or lower alkyl; and

Y represents cyano, lower alkoxycarbonyl, carbamoyl, N-lower alkylcarbamoyl, N,N-di-lower alkylcarbamoyl, lower alkylsulfonyl, or a phenylsulfonyl group.

The bis-methine compounds of the invention give yellow dyeings having excellent fastness when applied to hydrophobic textile fibers, yarns and fabrics by conventional means. Cellulose acetate, polyamide, modacrylic and polyester fibers are illustrative of the hydrophobic textile materials which can be dyed with the compounds of the invention. The compounds are water insoluble and therefore can be applied to hydrophobic textile materials by methods well known in the art of disperse dyes. Coloration of such textile materials can also be effected by incorporating the novel compounds into the dope or melt prior to spinning and then spinning the fiber as usual. The compounds of the invention exhibit exceptionally good fastness to sublimation on polyester fibers.

The p-phenylene groups which R and $R^6$ can represent can be substituted or unsubstituted. Typical of the p-phenylene groups represented by R and $R^6$ are p-phenylene, 3-methyl-4-phenylene, 3-chloro-4-phenylene, 3-bromo-4 phenylene, 3-methoxy-4-phenylene, 2-methoxy-5-chloro-4-phenylene, 3-ethyl-4-phenylene, 2,5-dimethoxy-4-phenylene, etc. The designation of the position of the substituents of the p-phenylene groups represented by R and $R^6$ is made with reference to the aniline intermediates, i.e., the anilino nitrogen atom is at the 1 position. A preferred group of the p-phenylene groups represented by R and $R^6$ have the formula

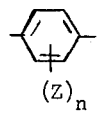

wherein Z represents hydrogen, lower alkyl, e.g. methyl, ethyl, butyl; lower alkoxy, e.g. methoxy, ethoxy, propoxy, butoxy; or halogen, e.g. chloro, bromo; and $n$ represents 1 or 2. When $n$ is 2, Z can be the same or different.

The alkyl groups which $R^1$ and $R^5$ can represent can be straight or branch chain, unsubstituted or substituted lower alkyl. As used herein to describe a substituent, "lower" refers to an alkyl moiety having up to about 4 carbon atoms. Typical alkyl groups represented by $R^1$ are methyl, ethyl, propyl, isopropyl, butyl, hydroxyalkyl, e.g. β-hydroxyethyl, 2,3-dihydroxypropyl; lower alkoxyalkyl, e.g. β-methoxyethyl; cyanoalkyl, e.g. β-cyanoethyl; cyanoalkoxyalkyl, e.g. β-cyanoethoxyethyl; lower alkanoyloxyalkyl, e.g. β-acetoxyethyl; lower alkoxycarbonylalkyl, e.g. β-ethoxycarbonylethyl; haloalkyl, e.g. β-chloroethyl, gamma-chloropropyl, β-bromethyl; hydroxyhalogenoalkyl, e.g. gamma-chloro-β-hydroxypropyl; lower alkanoylaminoalkyl, e.g. β-acetamidoethyl; carbamoylalkyl, e.g. β-carbamoylethyl; N-lower alkylcarbamoylalkyl, e.g. β-N-methylcarbamoylethyl; N-phenylcarbamoyloxyalkyl, e.g. β-N-phenylcarbamoylethyl; lower alkylsulfonylalkyl, e.g. β-methylsulfonylethyl; arylalkyl, e.g. benzyl; phenoxyalkyl, e.g. β-phenoxyethyl; lower alkylsulfonamidoalkyl, e.g. methylsulfonamidoethyl; N-phenylcarbamoyloxyalkyl; lower dicarboximidoalkyl, e.g. succinimidoethyl, etc. Although the alkyl groups represented by $R^1$ and $R^5$ are characterized as lower alkyl, when the alkyl group is substituted by a carbon containing substituent, e.g. alkoxy, the preferred substituted alkyl group can contain up to about 8 carbon atoms, e.g. delta-butoxybutyl.

The phenyl groups that $R^1$ and $R^5$ can represent include, for example, phenyl and phenyl substituted with lower alkyl, lower alkoxy, nitro, halogen, etc. Illustrative of such groups are phenyl, p-tolyl, m-nitrophenyl, o,p-dichlorophenyl, and p-anisyl. Cyclohexyl is typical of the cycloalkyl groups which $R^1$ and $R^5$ can represent.

The 1,2,3,4-tetrahydroquinoline group which R and $R^1$, and $R^5$ and $R^6$, together with their common nitrogen atom, can represent can be unsubstituted or substituted. The tetrahydroquinoline groups are attached to the cyanomethylidene groups at the 6 position and to the substituents $R^2$ and $R^4$ at the 1 position as is indicated by formula (I). Examples of the various substituents which can be present on the tetrahydroquinoline group include alkyl, alkoxy, halogen, dialkylamino, phenyl, alkanoyloxy, halogen, alkylsulfonamido, and alkanoylamino. A preferred group of tetrahydroquinolines which

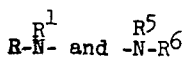

can collectively represent have the formula

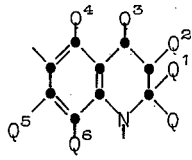

wherein

Q, $Q^1$, and $Q^3$ are the same or different and each represents hydrogen or lower alkyl;

$Q^2$ represents hydrogen, lower alkyl, lower alkoxy, halogen, hydroxy, or lower alkanoyloxy;

$Q^4$ represents hydrogen, lower alkyl, lower alkoxy, halogen, or, when $Q^5$ represents hydrogen or alkyl, phenyl;

$Q^5$ represents hydrogen, lower alkyl, lower alkoxy, halogen, lower alkanoylamino, lower alkylsulfonamido, lower dialkylamino, or, when $Q^4$ represents hydrogen or alkyl, phenyl;

$Q^6$ represents hydrogen, lower alkyl, lower alkoxy, or halogen.

The alkylene groups represented by $R^2$, $R^3$, and $R^4$ can be straight or branched chain, unsubstituted or substituted lower alkylene. Examples of the alkylene groups represented by $R^2$ are ethylene, propylene, isopropylene, n-butylene, isobutylene, haloalkylene, e.g. 2-chloropropylene, 2-bromopropylene, chloroethylene, hydroxyalkylene, e.g. 2-hydroxypropylene, hydroxyethylene, lower alkanoyloxyalkylene, e.g. 2-acetoxypropylene, etc.

The alkylene groups represented by $R^3$ in which an oxygen, sulfur, or nitrogen atom is present can contain up to about 6 carbon atoms. These groups have the general formula $-R^7-A-R^8$ wherein $R^7$ and $R^8$ are the same or different and each represents straight- or branch-chain alkylene having up to about 3 carbon atoms and A represents oxygen, sulfur, sulfonyl or $-NR^9-$ wherein $R^9$ is hydrogen or lower alkyl. Examples of such alkylene groups include $-CH_2SCH_2-$, $-CH_2CH_2SCH_2CH_2-$, $-CH_2OCH_2-$, $-CH_2CH_2CH_2SO_2CH_2CH_2CH_2-$, $-CH_2CH_2NHCH_2-$, $-CH_2N(CH_3)CH_2-$, etc.

The phenylene groups represented by $R^3$ can be o, m, or p phenylene which can be unsubstituted or substituted, for example, with lower alkyl, lower alkoxy, halogen, nitro, cyano, lower alkanoylamino, lower alkylsulfonamido, lower alkanoyloxy, etc. The groups described above relative to the definition of R and the ortho and meta analogs thereof are typical of the phenylene groups represented by $R^3$. Cyclohexylene, including 1,4-, 1,3-, and 1,2-cyclohexylene are representative of the cycloalkylene groups which $R^3$ can represent. Typical cyclohexylenedialkylene groups that $R^3$ can represent include 1,4-cyclohexylenedimethylene, 1,3-cyclohexylenedimethylene, and 1,2-cyclohexylenedimethylene. 1,4-naphthylene, 1,2-naphthylene, and 1,8-naphthylene are illustrative of the naphthylene groups represented by $R^3$. Such naphthylene groups also include naphthylene substituted, for example, with the groups that can be present on the substituted phenylene groups represented by $R^3$.

Typical lower alkoxycarbonyl groups represented by Y include methoxycarbonyl, ethoxycarbonyl, propoxycarbonyl, isopropoxycarbonyl, butoxycarbonyl, etc. Examples of the lower alkylsulfonyl groups which Y can represent are methylsulfonyl, ethylsulfonyl, propylsulfonyl, butylsulfonyl, etc. The phenyl group of the phenylsulfonyl groups which Y can represent can be unsubstituted or substituted, for example, with lower alkyl, lower alkoxy, halogen, etc. Examples of the substituted phenylsulfonyl groups which Y can be are p-tolylsulfonyl, p-anisylsulfonyl, p-chlorophenylsulfonyl, p-bromophenylsulfonyl, etc. Typical lower alkyl substituted carbamoyl groups are N-methylcarbamoyl, N-ethylcarbamoyl, N-propylcarbamoyl, N-butylcarbamoyl, N,N-dimethylcarbamoyl, N,N-diethylcarbamoyl, N,N-dipropycarbamoyl, etc.

Particularly preferred compounds of the invention have the general formulas

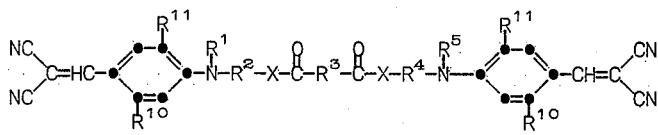

and

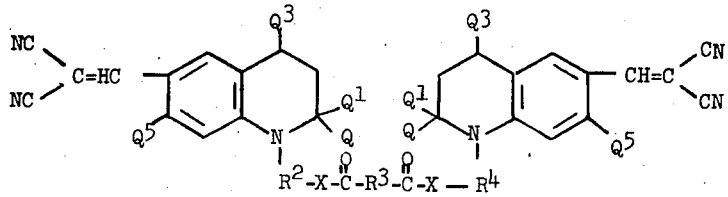

wherein $R^1$ and $R^5$ are lower alkyl;

$R^2$ and $R^4$ are lower alkylene, especially ethylene;

X is $-O-$ or $-NH-$;

$R^3$ is lower alkylene or o-, m-, or p-phenylene;

$R^{10}$ is hydrogen, lower alkyl, lower alkoxy, halogen, or lower alkanoyl-amino;

$R^{11}$ is hydrogen, lower alkyl, lower alkoxy, or halogen; and

Q, $Q^1$, $Q^3$ and $Q^5$ are the same or different and each represents hydrogen or lower alkyl.

As is well known in the art, the color of the compounds of the invention is attributable to the conjugated system of the cyanomethylidenephenylamino and the cyanomethylidenetrahydroquinoline moieties of the novel compounds. Thus the substituents present on the groups represented by R, $R^1$, $R^2$, $R^3$, $R^4$, $R^5$ and $R^6$ and the group represented by Y, as these substituents and groups are defined above, do not materially affect the primary usefulness of the compounds, i.e., the ability of the compounds to dye hydrophobic fibers. As can be seen from the subsequent examples, the substituents mentioned above function primarily as auxochrome groups to control the shade of the compounds of the invention.

The bis-methine compounds of the invention are prepared by reacting an aminoalkyl compound or hydroxyalkyl compound represented by the formulae

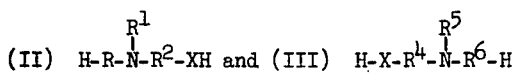

with a dicarboxylic acid, or lower alkyl ester thereof, having the formula

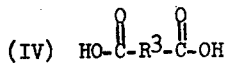

wherein R, $R^1$, $R^2$, $R^3$, $R^4$, $R^5$, $R^6$ and X are defined above. Thus, to prepare a symmetrical bis-methine compound, i.e., where R, $R^1$ and $R^2$ are the same as $R^4$, $R^5$ and $R^6$, the compounds of formulae (II) and (III) are the same and 2 moles of the aminoalkyl or hydroxyalkyl compound is reacted with 1 mole of an acid of formula (IV) to yield the intermediate compound (V):

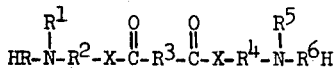

The reaction is carried out in the presence or absence of solvents and with the use of a catalyst such as sulfuric acid, p-toluenesulfonic acid, tetraisopropyltitanate, etc.

The intermediate compound (V) is then formylated (e.g., by treating with $POCl_3$ and dimethylformamide) and the formylated product is reacted with an active methylene compound, e.g. malononitrile, to yield the novel bis-methine compound of formula (I).

To prepare the unsymmetrical compounds of the invention, the procedure is essentially the same except that 1 mole of a compound of formula (II) is reacted with a dicarboxylic acid anhydride having the formula

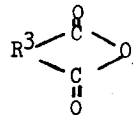

and the product obtained is reacted with a compound of formula (III), where the compounds of formulas (II) and (III) are different. The intermediate is then formylated and reacted with an active methylene compound as described above to yield the bis-methine compound of formula (I).

The intermediates useful in preparing the compounds of the invention are commercially available or can be prepared by known procedures.

Representative compounds corresponding to formulae (II) and (III) include N-ethyl-N-β-hydroxyethyl-m-toluidine, N-ethyl-N-β-hydroxyethylaniline, N-2-aminoethyl-N-ethyl-m-toluidine, N-n-butyl-N-β-hydroxyethyl-m-anisidine, N-chloroethyl-N-β-hydroxyethyl-m-chloroaniline, N-methoxyethyl-N-β-hydroxyethyl-m-chloroaniline, N-cyanoethyl-N-β-hydroxyethylaniline, N-acetamidoethyl-N-β-hydroxyethylaniline, N-phenoxyethyl-N-β-hydroxyethyl-m-toluidine, N-β-hydroxyethyl-N-ethoxycarbonyl-m-anisidine, N-carbonamidoethyl-N-2-aminoethylaniline, N-cyanoethoxyethyl-N-2-aminoethyl-m-anisidine, N-benzyl-N-2-aminoethyl-m-toluidine, N-phenyl-N-2-aminoethylaniline, N-succinimidoethyl-N-2-aminoethylaniline, etc. Where R and $R^1$, together with their common nitrogen atom, form a heterocyclic group, representative compounds are 1-(2-hydroxyethyl)-2,2,4,7-tetramethyl-1,2,3,4-tetrahydroquinoline, 1-(2-hydroxyethyl)-1,2,3,4-tetrahydroquinoline, 1-(2-hydroxyethyl)-2,2,4,7-tetraethyl-1,2,3,4-tetrahydroquinoline, 1-(2aminoethyl)-2,2,4-trimethyl-7-methoxy-1,2,3,4-tetrahydroquinoline, 1-(2-aminoethyl)-2,2,4-trimethyl-7-chloro-1,2,3,4-tetrahydroquinoline, 1-(2-hydroxyethyl)-2,2,4-trimethyl-7-ethoxy-1,2,3,4-tetrahydroquinoline, etc.

Representative compounds corresponding to formula (IV) include diethyl succinate, dimethyl glutarate, dimethyl maleate, dimethyl isophthalate, dimethyl terephthalate, dimethyl phthalate, 1,4-cyclohexanedicarboxylic acid, etc.

Typical active methylene compounds utilized in preparing the novel bis-methine compounds of the invention are malononitrile, methylsulfonylacetonitrile, methylcyanoacetate, phenylsulfonylacetonitrile, cyanoacetamide, etc.

The following examples further illustrate the preparation of representative intermediates and bis-methine compounds of the invention.

EXAMPLE 1 a. Preparation of bis[2-(N-ethyl-m-toluidino)ethyl]succinate

An amount of 34.8 g. diethyl succinate, 71.6 g. N-ethyl-N-β-hydroxyethyl-m-toluidine and 5 drops of titanium tetraisopropoxide are stirred and refluxed together for 3 hr., allowing ethanol to be removed. The reflux temperature rose from 170°C. to 210°C. during this period, and about 90% of the theoretical amount of ethanol is collected. The product is allowed to cool and a portion is converted into the bis-aldehyde.

b. Preparation of bis[2-(N-ethyl-4-formyl-m-toluidino)ethyl]succinate

An amount of 22.0 g. of bis[2-(N-ethyl-m-toluidino)ethyl]succinate is dissolved by stirring in 20 ml. of dry dimethylformamide. The solution is cooled and 10 ml. of phosphorus oxychloride added below 30°C. After heating 1 hr. on the steam bath, the reaction is drowned on an ice-water mixture. This mixture is then made basic with 50% NaOH, resulting in an oily product. The aqueous portion is decanted off and the bis-aldehyde taken up by heating with 75 ml. of ethanol. On cooling, the product crystallizes and is collected by filtration, washed with ethanol and air dried. The product melts at 85°–90°C. and one recrystallization from ethanol gives the pure bis-aldehyde melting at 95°–97°C.

c. Preparation of Bis-methine dye

An amount of 4.97 g. bis[2-(N-ethyl-4-formyl-m-toluidino)ethyl] succinate, 1.32 g. malononitrile, 100 ml. ethanol and 5 drops of piperidine are heated together on steam bath for 30 minutes. The product crystallizes on cooling and is collected by filtration. The crude product is heated to boiling in 100 ml. of ethanol, allowed to cool to about 50°C., filtered, washed with ethanol, and air dried. The yellow dye obtained melts at 152°–157°C. and dyes polyester fibers yellow shades of outstanding light and sublimation fastness. The dye has the following structure:

An amount of 48.8 g. of bis[2-(N-ethyl-m-toluidino)ethyl]isophthalate is dissolved in 50 ml. of dry dimethylformamide. The solution is cooled and 20 ml. $POCl_3$ added below 35°C. After heating 1½ hr. on the steam bath the reaction is drowned slowly with good stirring into 1 liter of water containing 35 ml. of 50% NaOH and enough ice to keep the mixture at about room temperature. A sticky product results which is washed once by decantation and then taken up in 500 ml. of hot ethanol. On standing at room temperature for several days, the product crystallizes and is collected by filtration, washed with ethanol and air dried; m.p. 89°–92°C. Elemental analysis (theoretical — % C — 70.5, % H — 6.7, % N — 5.1; found: — % C — 70.5, % H — 7.0, % N — 5.2).

c. Preparation of Bis-methine dyes

An amount of 2.74 g. bis[2-(N-ethyl-4-formyl-m-toluidino)ethyl] isophthalate, 0.66 g. malononitrile, 3

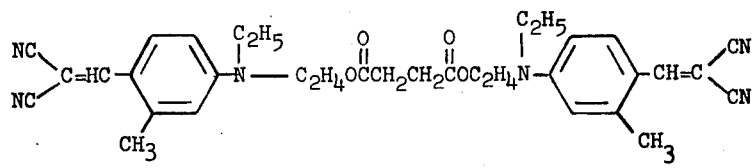

EXAMPLE 2 a. Preparation of Bis[2-(N-ethyl-m-toluidino)ethyl]isophthalate

An amount of 179 g. N-ethyl-N-β-hydroxyethyl-m-toluidine, 97 g. dimethylisophthalate, and 10 drops titanium tetraisopropoxide are refluxed together for 2 hr., allowing the methanol to be removed. The reflux temperature rose from 160°C. to 200°C. during this period. The mixture is then transferred to a distillation flask and low boiling material is removed (~35 g.) until the pot temperature reaches 200°C. at 0.8 mm. Hg. The product remaining in the flask weighs 213 g., and is a very heavy, viscous liquid.

b. Preparation of Bis[2-(N-ethyl-4-formyl-m-toluidino)ethyl]isophthalate drops piperidine, and 15 ml. methyl Cellosolve are heated together at 100°C. for 1 hr. The reaction is allowed to cool and the product collected by filtration, washed with ethanol, and air dried. The yellow dye melts at 158°–161°C. and dyes polyester fibers yellow shades having excellent light and sublimation fastness. The structure of this dye is:

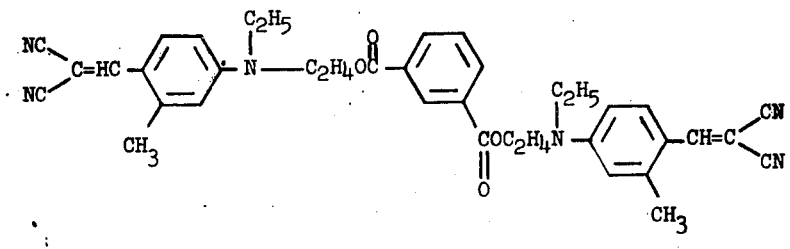

EXAMPLE 3

An amount of 1.3 g. bis[2-(N-ethyl-4-formyl-m-toluidino)ethyl] isophthalate, prepared according to Example 2(b), above, 0.60 g. methylsulfonylacetonitrile, 3 drops of piperidine, and 25 ml. ethanol are refluxed together for 2 hr. After allowing to stand overnight at room temperature, the product is filtered, washed with ethanol, and air dried. The yellow dye has the following structure:

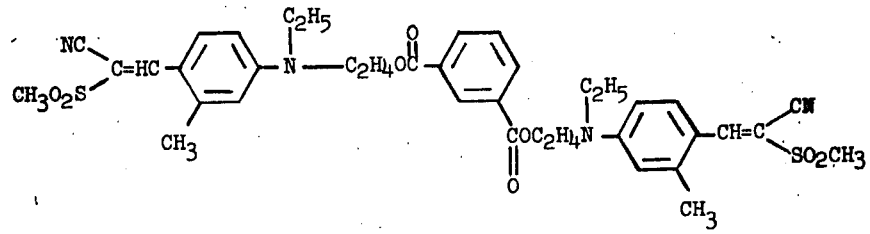

EXAMPLE 4

An amount of 1.36 g. bis[2-(N-ethyl-4-formyl-m-toluidino)ethyl] isophthalate and 0.50 g. methylcyanoacetate are reacted together using the same conditions of Example 3, to yield the following yellow dye:

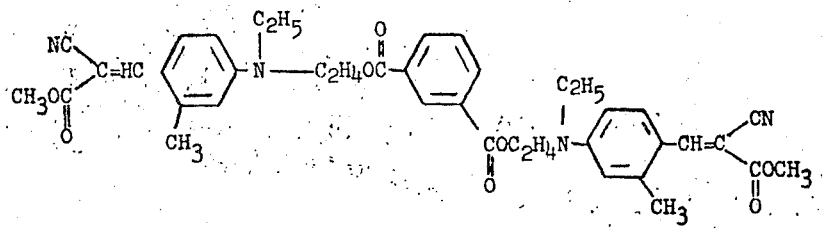

EXAMPLE 5

An amount of 1.36 g. bis[2-(N-ethyl-4-formyl-m-toluidino)ethyl] isophthalate and 0.90 g. phenylsulfonylacetonitrile are reacted together as in Example 3, to yield the following yellow dye:

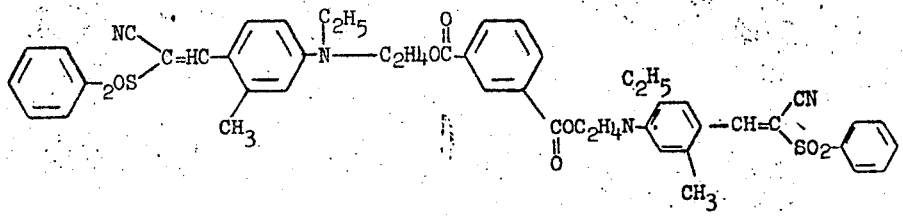

EXAMPLE 6

An amount of 1.36 g. bis[2-(N-ethyl-4-formyl-m-toluidino)ethyl] isophthalate and 0.42 g. 2-cyanoacetamide are reacted as in Example 3 to yield the following yellow dye:

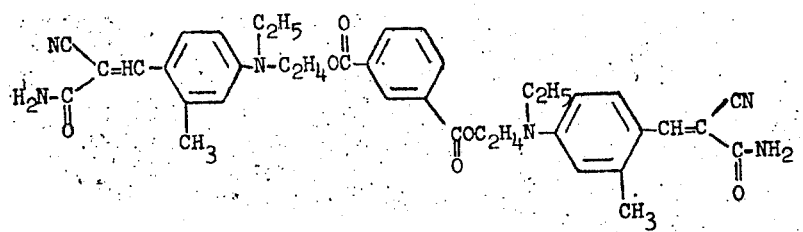

EXAMPLE 7 a. Preparation of Bis[2-(N-ethylanilino)ethyl]isophthalate

An amount of 82.5 g. N-ethyl-N-β-hydroxyethylaniline, 48.5 g. dimethylisophthalate, and 5 drops titanium tetraisopropoxide are heated together at reflux 2 hrs. The temperature rose from 180°C. to 215°C. during this period as methanol was removed. The product, which is a viscous liquid, is allowed to cool and is used to prepare the bis-aldehyde.

b. Preparation of bis[2-(N-ethyl-4-formylanilino)ethyl]isophthalate

An amount of 23.0 g. bis[2-(N-ethylanilino)ethyl]isophthalate is dissolved in 20 ml. of dry dimethylformamide. The solution is cooled and 10 ml. of phosphorus oxychloride are added below 30°C. After heating for 1 hr. at 95°C., the reaction is drowned into an ice-water mixture. This is made basic with 50% NaOH and the sticky product is washed by decantation. The product is taken up in 200 ml. ethanol and allowed to stand overnight. The bis-aldehyde crystallizes and is collected by filtration and dried. Recrystallization from 100 ml. ethanol gives the pure aldehyde melting at 102°–104°C.

c. Preparation of Bis-methine dye

An amount of 2.58 g. bis[2-(N-ethyl-4-formylanilino)ethyl]isophthalate, 0.66 g. malononitrile, 3 drops piperidine, and 25 ml. ethanol are refluxed together for 1 hr. The reaction is allowed to cool and the product is collected by filtration, washed with methanol, and air dried. The dye melts at 171°–176°C. and dyes polyester fibers bright, greenish yellow shades possessing excellent light and sublimation fastness. It has the following structure:

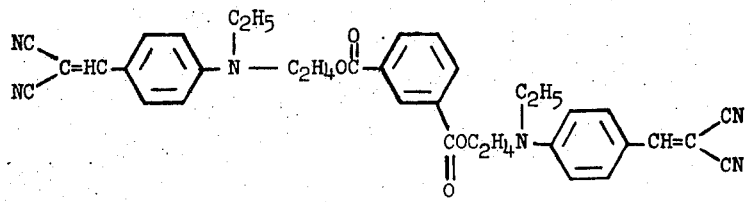

EXAMPLE 8 a. Preparation of bis[2-(N-ethyl-m-toluidino)ethyl]isophthalamide

An amount of 71.2 g. N-2-aminoethyl-N-ethyl-m-toluidine and 38.8 g. dimethylisophthalate are refluxed together for 2 hr. During this time methanol is removed, and the temperature rose from 185°C. to 250°C. The reaction mixture is allowed to cool to ~165°C. and poured gradually with stirring into 400 ml. ethanol. The solution is cooled to about 0°C. and the crystalline product is collected by filtration and air dried. The crude material is recrystallized from 400 ml. of ethanol, filtered, and air dried to give the pure product melting at 154°–156°C.

b. Preparation of Bis[2-(N-ethyl-4-formyl-m-toluidino)ethyl]isophthalamide

An amount of 4.86 g. bis[2-(N-ethyl-m-toluidino)ethyl]isophthalamide is stirred with 5 ml. dry dimethylformamide. To this slurry is added 2 ml. phosphorus oxychloride at about 25°C. The reaction mixture is heated 1 hr. on the steam bath, drowned on ice-water, made basic with 50% NaOH, and the product is washed by decantation. The sticky product is recrystallized from ethanol, filtered, and air dried; m.p. 100°–105°C.

c. Preparation of Bis-methine dye

An amount of 2.70 g. bis[2-(N-ethyl-4-formyl-m-toluidino)ethyl]-isophthalamide, 0.66 g. malononitrile, 3 drops piperidine, and 30 ml. ethanol are refluxed together for 2 hr. The product crystallizes on standing at room temperature for about 2 days, and is collected by filtration, washed with ethanol, and air dried; m.p. 122°–128°C. This product dyes polyester fibers deep yellow shades and has the following structure:

phthalate, and 5 drops of titanium tetraisopropoxide are refluxed together for 3 hr. During this time methanol is removed and the temperature rose from 135°C. to 185°C. This product is used to prepare the bisaldehyde.

b. Preparation of Bis[2-(6-formyl-1,2,3,4-tetrahydro-2,2,4,7-tetramethyl-1-quinolyl)ethyl]isophthalate An amount of 29.8 g. bis[2-(1,2,3,4-tetrahydro-2,2,4,7-tetramethyl-1-quinolyl)ethyl]isophthalate is treated with 20 ml. dry dimethyl formamide and 10 ml. POCl₃ as illustrated in the preceding examples. The product, after drowning on ice-water mixture and basifying, gives a sticky aldehyde, which does not crystallize.

c. Preparation of Bis-methine compound

An amount of 2.18 g. bis[2-(6-formyl-1,2,3,4-tetrahydro-2,2,4,7-tetramethyl-1-quinolyl)ethyl]isophthalate, 0.44 g. malononitrile, 3 drops piperidine, and 35 ml. ethanol are refluxed together for 1 hr. The reaction mixture is allowed to cool, and the product is collected by filtration, washed with ethanol, and air dried. The dye gives beautiful yellow dyeings on polyester fibers having good light and sublimation fastness. It has the following structure:

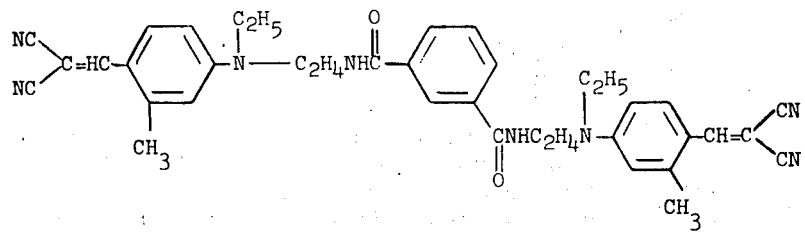

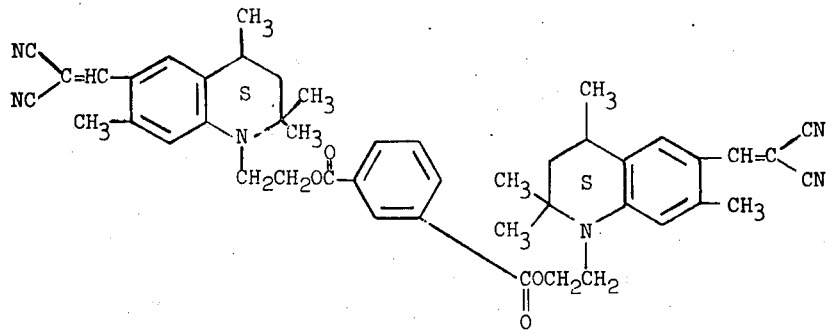

EXAMPLE 9 a. Preparation of Bis[2-(1,2,3,4-tetrahydro-2,2,4,7-tetramethyl-1-quinolyl)ethyl]isophthalate An amount of 46.6 g. 1-(2-hydroxyethyl)-2,2,4,7-tetramethyl-1,2,3,4-tetrahydroquinoline, dimethyl iso- The compounds described in the examples of Table 1 are prepared according to the procedure of Examples 1–9 and correspond to the general formula:

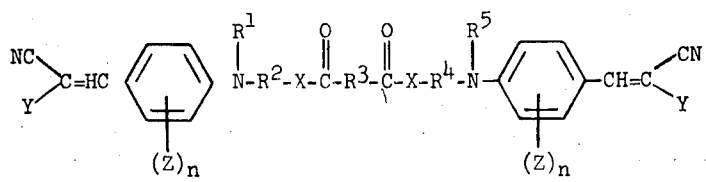

The compounds of Table 1 give yellow dyeings of excellent fastness properties on polyester fibers.

TABLE 1

| Example No. | (Z)n | R¹, R⁵ | R², R⁴ | X | R³ | Y |
|---|---|---|---|---|---|---|
| 10 | 3-CH₃ | -C₂H₅ | -CH₂CH₂- | -O- | p-phenylene | -CN |
| 11 | 3-CH₃ | -C₂H₅ | -CH₂CH₂- | -O- | o-phenylene | -CN |
| 12 | 3-CH₃ | -CH₃ | -CH₂CH₂- | -O- | thiopyranyl (S) | -CN |
| 13 | 3-OCH₃ | -C₂H₅ | -CH₂CH₂- | -O- | phenyl-NO₂ | -CN |
| 14 | 3-Cl | -C₂H₅ | -CH₂CH₂- | -O- | phenyl-Cl | -CN |
| 15 | 3-CH₃ | -C₂H₅ | -CH₂CH₂- | -O- | naphthyl | -CN |
| 16 | 3-CH₃ | -C₄H₉-n | -CH₂CH₂- | -O- | dimethyl-OCH₃-phenyl | -CN |
| 17 | 3-CH₃ | -C₂H₅ | -CH₂CH₂- | -O- | CH₃C(O)NH-CH₃-phenyl | -CN |
| 18 | 3-CH₃ | -C₂H₅ | -CH₂CH₂- | -NH- | -CH₂-phenyl | -CN |
| 19 | 2,5-di-CH₃ | -C₂H₄Cl | -CH₂CH₂- | -O- | phenyl | -CN |
| 20 | 2,5-di-CH₃ | -C₂H₄OCH₃ | -CH₂CH₂- | -O- | phenyl | -CN |
| 21 | 2,5-di-OCH₃ | -C₂H₅ | -CH₂CH₂CH₂- | -O- | phenyl | -CN |
| 22 | 3-NHCOCH₃ | -C₂H₅ | -CH₂CH₂- | -O- | phenyl | -CN |
| 23 | 3-phenyl | -C₂H₅ | -CH₂CH₂- | -O- | phenyl | -CN |
| 24 | 3-phenoxy | -C₂H₅ | -CH₂CH₂- | -O- | phenyl | -CN |
| 25 | 3-NHSO₂CH₃ | -C₂H₅ | -CH₂CH₂- | -O- | phenyl | -CN |
| 26 | 3-CH₃ | -C₂H₄CN | -CH₂CH₂- | -O- | -CH₂CH₂- | -CN |
| 27 | 3-CH₃ | -C₂H₄COCH₃ | -CH₂CH₂- | -O- | -CH(CH₃)-CH₂- | -CN |
| 28 | H | -C₂H₄OC₆H₅ | -CH₂CH₂- | -O- | -CH₂CH₂- | -CN |
| 29 | H | -C₂H₄COOC₂H₅ | -CH₂CH₂- | -O- | -CH₂CH₂- | -CN |
| 30 | H | -C₂H₄SO₂CH₃ | -CH₂CH₂- | -O- | -CH₂OCH₂- | -COOCH₃ |
| 31 | H | -C₂H₄CONH₂ | -CH₂CH₂- | -O- | -C≡C- | -COOC₂H₅ |
| 32 | 3-Cl | -C₂H₄OC₂H₄CN | -CH₂CH₂- | -O- | -CH₂CH₂- | -COOC₂H₅ |
| 33 | 3-Cl | -CH₂-phenyl | -CH₂CH₂- | -O- | -CH₂CH₂- | -CONH₂ |
| 34 | 3-OCH₃ | -phenyl | -CH₂CH₂- | -O- | -CH₂CH₂- | -CN |
| 35 | 3-OCH₃ | -C₂H₄N(COCH₂/COCH₂) | -CH₂CH₂- | -O- | -CH₂CH₂- | -CN |
| 36 | 3-OCH₃ | -C₂H₄N(CH₃)₂ | -CH₂CH₂- | -O- | -CH₂CH₂- | -CN |
| 37 | 3-CH₃ | -C₂H₅ | -CH₂CH₂- | -O- | -CH=CH- | -CN |
| 38 | 3-CH₃ | -C₂H₅ | -CH₂CH₂- | -O- | -(CH₂)₄- | -CN |
| 39 | 3-CH₃ | -C₂H₅ | -CH₂- | -O- | -CH₂CH₂- | -CN |
| 40 | 3-CH₃ | -C₂H₅ | -CH₂CHCH₂- (CH₃) | -NH- | -CH₂CH₂- | -CN |
| 41 | 3-CH₃ | -C₂H₄CN | -CH₂CH₂- | -O- | -CH₂CH₂- | -CN |

Table 1 (Continued)

| Example No. | (Z)n | R¹, R⁵ | R², R⁴ | X | R³ | Y |
|---|---|---|---|---|---|---|
| 42 | 3-CH₃ | -C₂H₅ | -CH₂CH₂- | -N(CH₃)- | -CH₂CH₂- | -CN |
| 43 | 3-CH₃ | -CH₂CF₃ | -CH₂CH₂- | -O- | -CH₂CH₂- | -CN |
| 44 | 3-C₂H₅ | -CH₃ | -CH₂CH₂- | -O- | -CH₂N(H)CH₂- | -CN |
| 45 | 3-C₄H₉-n | -CH₃ | -CH₂CH₂- | -O- | -CH₂CH₂- | -CN |
| 46 | 3-OC₂H₅ | -CH₃ | -C₄H₈- | -O- | -CH₂CH₂- | -CN |
| 47 | 3-OC₃H₇ | -CH₃ | -CH₂CH₂- | -O- | -CH₂SCH₂- | -CN |

The compounds set forth in the examples of Table 2 are prepared according to the procedure of Examples 1–9 and correspond to the general formula:

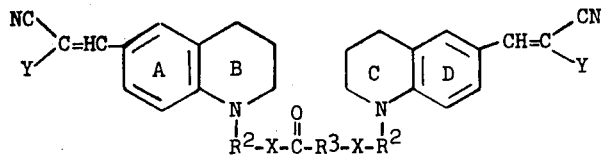

The compounds impart yellow shades to, and display excellent fastness properties on, polyester fibers.

The compounds of the examples in Table 3 are prepared according to the procedure described in Examples 1–9 and correspond to the general formula:

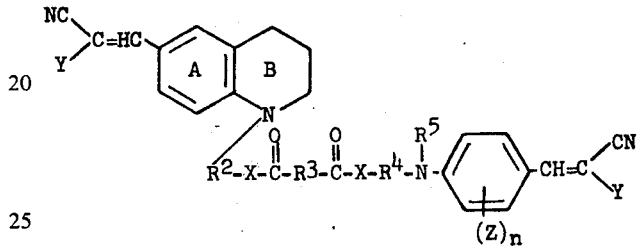

The compounds give yellow dyeings of excellent fastness properties on polyester fibers.

Table 2

| Example No. | Substituents on Ring B | Substituents on Ring A | R², R⁴ | X | R³ | Substituents on Ring C | Substituents on Ring D | Y |
|---|---|---|---|---|---|---|---|---|
| 48 | None | None | -CH₂CH₂- | -O- | ⟨phenyl⟩ | None | None | -CN |
| 49 | 2-CH₃ | None | -CH₂CH₂- | -O- | ⟨phenyl⟩ | 2-CH₃ | None | -CN |
| 50 | None | 7-CH₃ | -CH₂CH₂- | -O- | ⟨phenyl⟩ | None | 7-CH₃ | -CN |
| 51 | 2-CH₃ | 7-CH₃ | -CH₂CH₂- | -NH- | -CH₂CH₂- | 2-CH₃ | 7-CH₃ | -CN |
| 52 | 2,2,4-tri-CH₃ | None | -CH₂CH₂- | -O- | -CH₂CH₂- | 2,2,4-tri-CH₃ | None | -COOCH₃ |
| 53 | 2,2,4-tri-CH₃ | 7-CH₃ | -CH₂CH₂- | -O- | -CH₂CH₂- | 2,2,4-tri-CH₃ | 7-CH₃ | -CONH₂ |
| 54 | 2-CH₃ | 7-OCH₃ | -CH₂CH₂- | -O- | -CH₂CH₂- | 2-CH₃ | 7-OCH₃ | -CN |
| 55 | 2-CH₃ | 7-Cl | -CH₂CH₂- | -O- | -CH₂CH₂- | 2-CH₃ | 7-Cl | -CN |
| 56 | 2-CH₃ | 7-NHCOCH₃ | -CH₂CH₂- | -O- | -CH₂CH₂- | 2-CH₃ | 7-NHCOCH₃ | -CN |
| 57 | 2-CH₃ | 7-CH₃ | -CH₂CH₂CH₂- | -NH- | ⟨phenyl⟩ | 2-CH₃ | 7-CH₃ | -CN |
| 58 | 2-CH₃ | 7-CH₃ | -CH₂CH₂CH₂- | -NH- | ⟨phenyl⟩ | 2-CH₃ | 7-CH₃ | -SO₂CH₃ |
| 59 | 2-CH₃ | 7-CH₃ | -CH₂CH₂- | -O- | ⟨phenyl⟩ | H | H | -CN |
| 60 | 2-CH₃ | 7-CH₃ | -CH₂CH₂- | -O- | ⟨phenyl⟩ | H | 7-CH₃ | -CN |
| 61 | 2,2,4-tri-CH₃ | 7-CH₃ | -CH₂CH₂- | -O- | -CH₂OCH₂- | 2-CH₃ | 7-CH₃ | -CN |
| 62 | 2-C₂H₅ | 7-C₂H₅ | -CH₂CH₂- | -O- | -CH₂CH₂- | 2-CH₃ | 7-CH₃ | -CN |
| 63 | 2-C₃H₇ | 7-OC₂H₅ | -CH₂CH₂- | -O- | -CH₂CH₂- | 2-CH₃ | 7-C₃H₇ | -CN |
| 64 | 2-C₂H₅ | 7-C₄H₉-n | -CH₂CH₂- | -O- | -CH₂CH₂- | 2-CH₃ | 7-OC₃H₇ | -CN |
| 65 | 2-C₄H₉ | 7-CH₃ | -CH₂CH₂- | -O- | -CH₂CH₂- | 2-CH₃ | 7-OC₃H₇ | -CN |

Table 3

| Example No. | Substituents on Ring B | Substituents on Ring A | $R^2$ | X | $R^3$ | $R^4$ | $R^5$ | $(Z)_n$ | Y |
|---|---|---|---|---|---|---|---|---|---|
| 66 | H | H | -CH$_2$CH$_2$- | -O- | -CH$_2$CH$_2$- | -CH$_2$CH$_2$- | -C$_2$H$_5$ | 3-CH$_3$ | -CN |
| 67 | 2-CH$_3$ | 7-CH$_3$ | -CH$_2$CH$_2$- | -O- | phenyl | -CH$_2$CH$_2$- | -C$_2$H$_5$ | 3-CH$_3$ | -CN |
| 68 | 2,2,4-tri-CH$_3$ | 7-CH$_3$ | -CH$_2$CH$_2$- | -O- | phenyl | -CH$_2$CH$_2$- | -CH$_3$ | H | -CN |
| 69 | 2,2,4-tri-CH$_3$ | 7-CH$_3$ | -CH$_2$CH$_2$- | -O- | -CH$_2$CH$_2$- | -CH$_2$CH$_2$- | -C$_2$H$_4$CN | 3-CH$_3$ | -CN |
| 70 | 2-CH$_3$ | 7-CH$_3$ | -CH$_2$CH$_2$CH$_2$- | -NH- | -CH$_2$CH$_2$- | -CH$_2$CH$_2$- | -C$_2$H$_5$ | 3-CH$_3$ | -CN |
| 71 | 2-CH$_3$ | 7-CH$_3$ | -CH$_2$CH$_2$- | -O- | -CH=CH- | -CH$_2$CH$_2$- | -C$_2$H$_5$ | 3-CH$_3$ | -COOC$_2$H$_5$ |
| 72 | 2-CH$_3$ | 7-CH$_3$ | -CH$_2$CH$_2$- | -O- | -CH$_2$CH$_2$- | -CH$_2$CH$_2$- | -C$_2$H$_5$ | 3-CH$_3$ | -CONH$_2$ |
| 73 | -C$_2$H$_5$ | 7-CH$_3$ | -CH$_2$CH$_2$- | -O- | -CH$_2$CH$_2$- | -CH$_2$CH$_2$- | -C$_2$H$_5$ | 3-Cl | -CN |
| 74 | -C$_3$H$_7$ | 7-CH$_3$ | -CH$_2$CH$_2$- | -O- | -CH$_2$CH$_2$- | -CH$_2$CH$_2$- | -C$_2$H$_5$ | 3-OCH$_3$ | -CN |
| 75 | -C$_4$H$_9$-n | 7-CH$_3$ | -CH$_2$CH$_2$ | -O- | -CH$_2$CH$_2$- | -CH$_2$CH$_2$- | -C$_2$H$_5$ | 3-NHCOCH$_3$ | -CN |

The compounds of the invention can be used for dyeing hydrophobic fibers such as linear polyester, cellulose ester, polyamide, etc., fibers in the manner described in U.S. Pat. Nos. 2,880,050, 2,782,187, 2,757,064, and 3,043,827. The following example illustrates a method by which the compounds of the invention can be used to dye hydrophobic textile materials.

EXAMPLE 76

An amount of 0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. Then, 3 cc. of Tanavol (an anionic solvent carrier; Tanatex Chemical Corp.) are added and 10 grams of a textile fabric made of poly(ethylene terephthalate) polyester fibers are entered. The fabric is worked 10 minutes without heat and then for 10 minutes at 80°C. The dye bath is then brought to the boil and held at the boil for 1 hour. Following this, the fabric is rinsed in warm water, then scoured in aqueous 0.2% soap, 0.2% soda ash solution. After scouring, the fabric is rinsed with water and dried. When the compounds are used to dye polyamide textile materials, the above described procedure can be employed except the Tanavol dyeing assistant need not be used. In applying the compounds of the invention to cellulose acetate fibers, the above procedure can be employed, omitting the Tanavol and carrying out the dyeing at 80°C.

Polymeric linear polyester materials of the terephthalate type are illustrative of the linear aromatic polyester textile materials that can be dyed with the new compounds of our invention. Examples of such linear polyester materials are those prepared from ethylene glycol and dimethylterephthalate and those prepared from 1,4-cyclohexanedimethanol and dimethylterephthalate. Polyester textile materials prepared from 1,4-cyclohexanedimethanol and dimethylterephthalate are more particularly described in U.S. Pat. No. 2,901,446. Poly(ethylene terephthalate) fibers are described, for example, in U.S. Pat. No. 2,465,319. The polymeric linear polyester materials disclosed in U.S. Pat. Nos. 2,945,010, 2,957,745, and 2,989,363, for example, can be dyed. The linear aromatic polyester materials specifically named have a melting point of at least 200°C.

Examples of the polyamide fibers that can be dyed with the compounds of the invention are those consisting of Nylon 66, made by the polymerization of adipic acid and hexamethylenediamine, Nylon 6, prepared from epsilon-aminocaproic acid lactam, and Nylon 8. Fibers of cellulose triacetate and partially hydrolyzed cellulose acetate can also be dyed with the compounds of the invention.

The invention has been described in considerable detail with particular reference to certain preferred embodiments thereof, but it will be understood that variations and modifications can be effected within the spirit and scope of the invention as described above and as defined in the appended claims.

We claim:
1. A compound having the formula

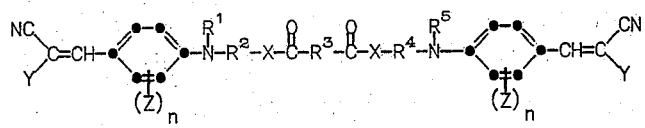

wherein
R$^1$ and R$^5$ each is lower alkyl; lower alkyl substituted with lower alkoxy or phenyl; or cyclohexyl;

$R^2$ and $R^4$ each is lower alkylene;

$R^3$ is lower alkylene; vinylene; cyclohexylene; cyclohexylene-di-lower-alkylene; phenylene; phenylene substituted with lower alkyl, lower alkoxy, chlorine, bromine or halogen; or a group having the formula $-R^7-A-R^8-$ wherein $R^7$ and $R^8$ each is alkylene of 1 to 3 carbon atoms and A represents oxygen, sulfur, sulfonyl, or $-NR^9-$ wherein $R^9$ is hydrogen or lower alkyl;

X is $-O-$ or $-NH-$;

Y is cyano, lower alkoxycarbonyl, carbamoyl, lower alkylsulfonyl or phenylsulfonyl;

each Z is hydrogen, lower alkyl, lower alkoxy, chlorine or bromine; and n is 1 or 2.

2. A compound according to claim 1 having the formula

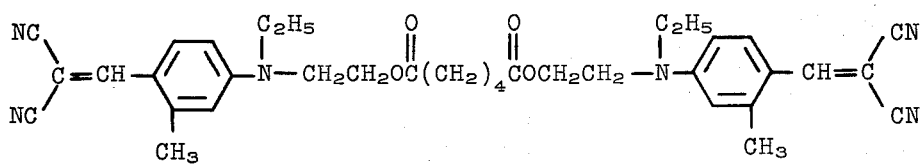

3. A compound according to claim 1 wherein $R^3$ represents lower alkylene, vinylene, cyclohexylene, phenylene, or phenylene substituted with lower alkyl, lower alkoxy, or halogen; and Y represents cyano.

4. A compound according to claim 1 having the formula

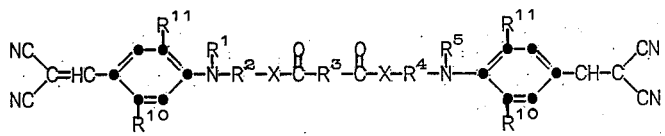

wherein $R^{10}$ represents hydrogen, lower alkyl, lower alkoxy, chlorine, or bromine;

$R^{11}$ represents hydrogen, lower alkyl, lower alkoxy, chlorine or bromine;

$R^1$ and $R^5$ represent lower alkyl;

$R^2$ and $R^4$ represent lower alkylene;

X represents $-O-$; and $R^3$ represents lower alkylene or o-, m- or p-phenylene.

5. A compound according to claim 4 wherein $R^{10}$ represents hydrogen or lower alkyl; and $R^{11}$ represents hydrogen.

6. A compound according to claim 1 having the formula

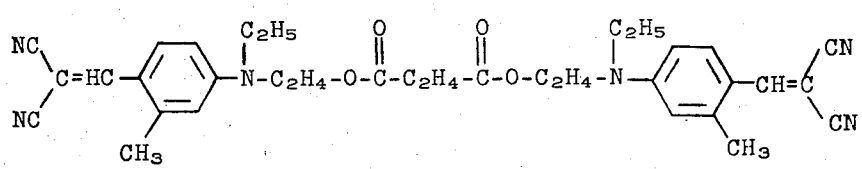

7. A compound according to claim 1 having the formula

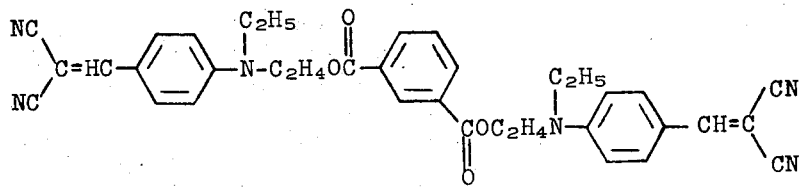

8. A compound according to claim 1 having the formula

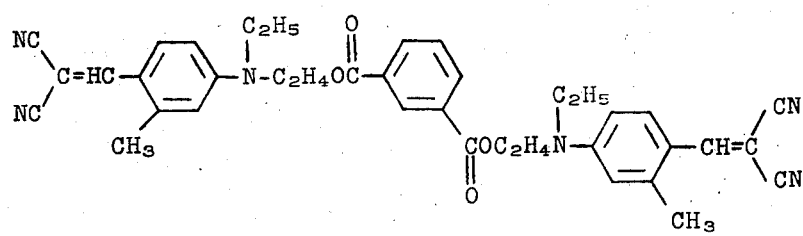

9. A compound according to claim 1 having the formula

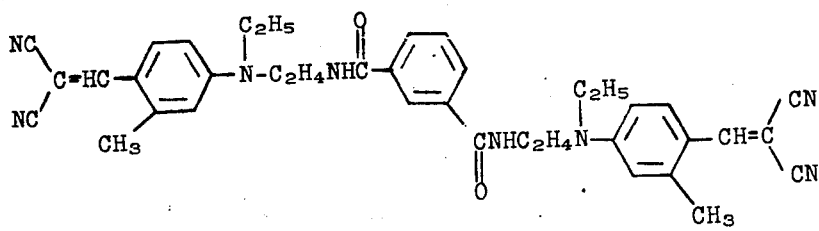

10. A compound of the formula

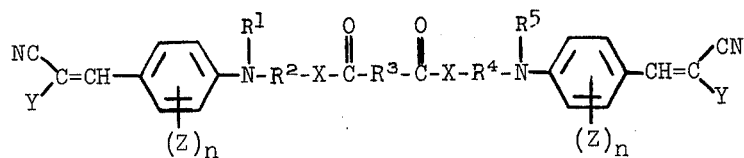

wherein
Y is cyano, lower alkoxycarbonyl, carbamoyl or phenylsulfonyl;
each Z is hydrogen, lower alkyl, lower alkoxy, chlorine or bromine;
$n$ is 1 or 2;
$R^1$ and $R^5$ each is lower alkyl or lower alkyl substituted by lower alkoxy or phenyl; $R^2$ and $R^4$ each is lower alkylene;
X is —O— or —NH—; and
$R^3$ is lower alkylene, cyclohexylene or phenylene.

* * * * *